United States Patent
Shimada

(10) Patent No.: US 9,300,228 B2
(45) Date of Patent: Mar. 29, 2016

(54) VIBRATORY DRIVE APPARATUS USING LUBRICANT BETWEEN ELASTIC MEMBER AND PIEZOELECTRIC MEMBER

(71) Applicant: CANON KABUSHIKI KAISHA, Tokyo (JP)

(72) Inventor: Akira Shimada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 13/915,751

(22) Filed: Jun. 12, 2013

(65) Prior Publication Data

US 2013/0342076 A1  Dec. 26, 2013

(30) Foreign Application Priority Data

Jun. 22, 2012  (JP) .................. 2012-140541

(51) Int. Cl.
*H02N 2/02* (2006.01)
*H02N 2/00* (2006.01)
*H02N 2/10* (2006.01)

(52) U.S. Cl.
CPC ............. *H02N 2/001* (2013.01); *H02N 2/0015* (2013.01); *H02N 2/106* (2013.01)

(58) Field of Classification Search
CPC ........ H01L 41/09; H02N 2/001; H02N 2/106; H02N 2/147
USPC .......................................................... 310/323
See application file for complete search history.

(56) References Cited

U.S. PATENT DOCUMENTS

| | | | |
|---|---|---|---|
| 5,739,623 A * | 4/1998 | Kanazawa et al. ........ | 310/323.12 |
| 6,781,283 B2 | 8/2004 | Tsukimoto | |
| 7,608,982 B2 * | 10/2009 | Nitto et al. ................ | 310/323.12 |
| 2009/0134745 A1 * | 5/2009 | Ashizawa ................ | 310/323.16 |
| 2012/0177354 A1 * | 7/2012 | Ashizawa et al. ............. | 396/133 |
| 2013/0234560 A1 | 9/2013 | Shimada | |

FOREIGN PATENT DOCUMENTS

| | | |
|---|---|---|
| JP | 2002-291263 A | 10/2002 |
| JP | 2003-134858 A | 5/2003 |
| JP | 2004-023863 A | 1/2004 |
| JP | 2013186302 A * | 9/2013 |
| JP | 2013207881 A * | 10/2013 |

* cited by examiner

*Primary Examiner* — J. San Martin
(74) *Attorney, Agent, or Firm* — Fitzpatrick, Cella, Harper & Scinto

(57) ABSTRACT

A highly-durable vibratory drive apparatus is provided without the need for additional assembly processes. The vibratory drive apparatus includes: a vibrator including a first elastic member, a second elastic member and an electro-mechanical energy conversion element, the electro-mechanical energy conversion element being between the first elastic member and the second elastic member; a moving member configured to contact the vibrator and be moved relative to the vibrator; and a lubricant provided between the first elastic member and the electro-mechanical energy conversion element.

12 Claims, 3 Drawing Sheets

OSCILLATION AMPLITUDE
IN OSCILLATION MODE

VIBRATORY DRIVE APPARATUS USING LUBRICANT BETWEEN ELASTIC MEMBER AND PIEZOELECTRIC MEMBER

BACKGROUND OF THE INVENTION

1. Field of the Invention

The present invention relates to a vibratory drive apparatus, for example, a rod-type vibratory drive apparatus including a piezoelectric member clamped between two elastic members, and a rotor configured to contact the piezoelectric member at one end and be frictionally driven by vibration excited in the vibrator.

2. Description of the Related Art

In general, a vibratory drive apparatus has applications for products, for example, for driving a camera lens, and there are two types of vibratory drive apparatuses: a ring-type vibratory drive apparatus and a rod-type vibratory drive apparatus.

A conventional rod-type vibratory drive apparatus (see Japanese Patent Application Laid-Open No. 2002-291263, for example) includes as its basic component a vibrator in which driving vibration is generated, and for example, the rod-type vibratory drive apparatus is configured to move the vibrator and a rotor, which is in contact with and pressed against the vibrator, relative to each other by the driving vibration.

The rod-shaped vibrator includes at least two elastic members and a piezoelectric element inserted between the at least two elastic members. In order to generate vibration efficiently, the piezoelectric element is clamped with predetermined clamping force. In such a configuration, an electric field is applied to the piezoelectric element to excite two mutually-perpendicular flexural vibrations in the vibrator, thereby inducing an elliptical motion on the elastic members. Then, a rotor which is pressed against the elastic members can receive frictional force as its driving force.

If an output of the vibratory drive apparatus is relatively large, i.e., the vibration of the vibrator is relatively strong, a portion of the piezoelectric element around a high stress point will be worn and the output of the vibratory drive apparatus may decrease.

The piezoelectric element is a ceramic sintered body which is made primarily of lead zirconate titanate, and generally has a lower hardness than those elastic members which are made of stainless steel. Thus, if the vibratory drive apparatus is driven and shearing force is exerted to the vicinity of the contact surfaces of the elastic members and the piezoelectric element, resulting in slight sliding between the elastic members and the piezoelectric element, the piezoelectric element will be worn. Wear debris produced then degrades adhesion and further introduces non-uniformity between the elastic members and the piezoelectric element. In addition, if the wear debris is produced unevenly, the horizontal-to-vertical ratio of the above mentioned elliptical motion on the elastic members will be large, resulting in a decrease in efficiency.

To address this problem, conventionally, the elastic members and the piezoelectric element need to be adhered to each other to eliminate the slight sliding and suppress the wear of the piezoelectric element.

Otherwise, a relatively soft thin plate made of aluminum, copper or the like is inserted between the elastic members and the piezoelectric element to relieve stress from concentrating on a certain point and thereby prevent the wear of the piezoelectric element.

SUMMARY OF THE INVENTION

However, the conventional vibratory drive apparatus which prevents the wear of the piezoelectric element in the above described manner has the following problems.

The conventional vibratory drive apparatus in which the elastic members and the piezoelectric element are adhered to each other requires additional assembly processes, which increases costs. In particular, even when an ultraviolet cure anaerobic adhesive, which is relatively easy to handle among other adhesives, is used, additional assembly processes, for example, a process of pressing the elastic members and the piezoelectric element against each other with an appropriate contact pressure for an appropriate period of time, and a process of curing excessive adhesive which comes out from between the elastic members and the piezoelectric element by ultraviolet irradiation, are required and this results in an increase in costs.

Moreover, the conventional vibratory drive apparatus in which a thin plate made of aluminum, copper or the like is inserted between the elastic members and the piezoelectric element requires a larger number of components and this again increases costs.

In the light of the above mentioned problems, the object of the present invention is to provide a highly-durable vibratory drive apparatus without the need for additional assembly processes.

One aspect of the present invention is related to a vibratory drive apparatus including: a vibrator including a first elastic member, a second elastic member and an electro-mechanical energy conversion element, the electro-mechanical energy conversion element being between the first elastic member and the second elastic member; a moving member configured to contact the vibrator and be moved relative to the vibrator; and a lubricant provided between the first elastic member and the electro-mechanical energy conversion element.

Another aspect of the present invention is related to a vibratory drive apparatus including: a vibrator including a first elastic member, a second elastic member and an electro-mechanical energy conversion element, the electro-mechanical energy conversion element being between the first elastic member and the second elastic member; a moving member configured to contact the vibrator and be moved relative to the vibrator; and a lubricant provided between the second elastic member and the electro-mechanical energy conversion element.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment

Figure 1:
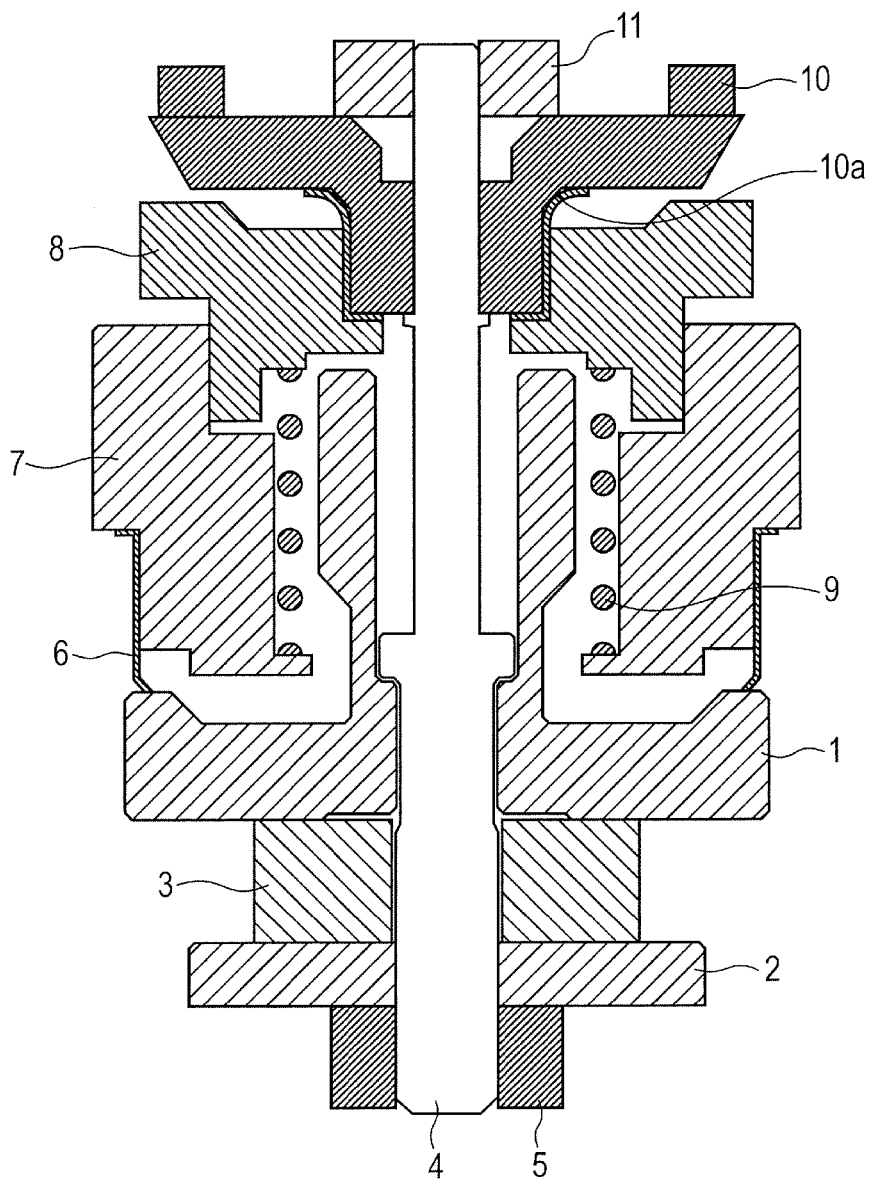
FIG. 1 is a cross-sectional view illustrating an exemplary configuration of a vibratory drive apparatus.

Referring to FIG. 1, an exemplary configuration of a vibratory drive apparatus according to the present embodiment includes a vibrator in which an electro-mechanical energy conversion element is provided between a first elastic member and a second elastic member. The exemplary configuration of the vibratory drive apparatus also includes a moving member configured to contact the vibrator and be moved relative to the vibrator by vibration excited in the vibrator by application of a driving signal to the electro-mechanical energy conversion element.

In particular, as illustrated in FIG. 1, the vibratory drive apparatus includes a first elastic member 1, a second elastic member 2, a piezoelectric element (electro-mechanical energy conversion element) 3, shaft 4, and a lower fixing member 5.

The first elastic member 1, second elastic member and laminated piezoelectric element 3 are clamped with predetermined clamping force by the shaft 4, the lower fixing member 5 and an upper fixing member 11. The first elastic member 1, second elastic member 2, piezoelectric element 3, shaft 4 and lower fixing member 5 constitute a rod-shaped vibrator 12. The surface of lower end of a slide member 6 contacts the first elastic member 1. The slide member 6 is adapted to have a small contact area and suitable springiness. A rotor 7, which is a part of a moving member, is fixed to the slide member 6, and thus rotates together with the slide member 6 as one unit.

As an example, a nut may be used as the lower fixing member 5 and the upper fixing member 11.

A gear (output transmission member) 8 is provided on an upper surface of the rotor 7 and rotated together with the rotor 7, thereby transmitting an output of the vibratory drive apparatus to the outside. A recessed portion formed on the upper surface of the rotor 7 engages a protruding portion formed on the gear 8. The gear 8 is fixed in position in the thrust direction of the shaft 4 by means of a flange 10 for mounting the vibratory drive apparatus. In addition, a pressure spring 9 is provided between the gear 8 and the rotor 7 to put pressure on the rotor 7. A flange cap 10a is press-fit to the flange 10 to prevent wear of the flange 10. The laminated piezoelectric element 3 includes groups of electrodes each including two electrodes. When alternating electric fields which are different in phase are applied to the respective groups of electrodes from a power supply (not shown), two flexural vibrations perpendicular to each other are excited in the vibrator 12.

Figures 2A, 2B:
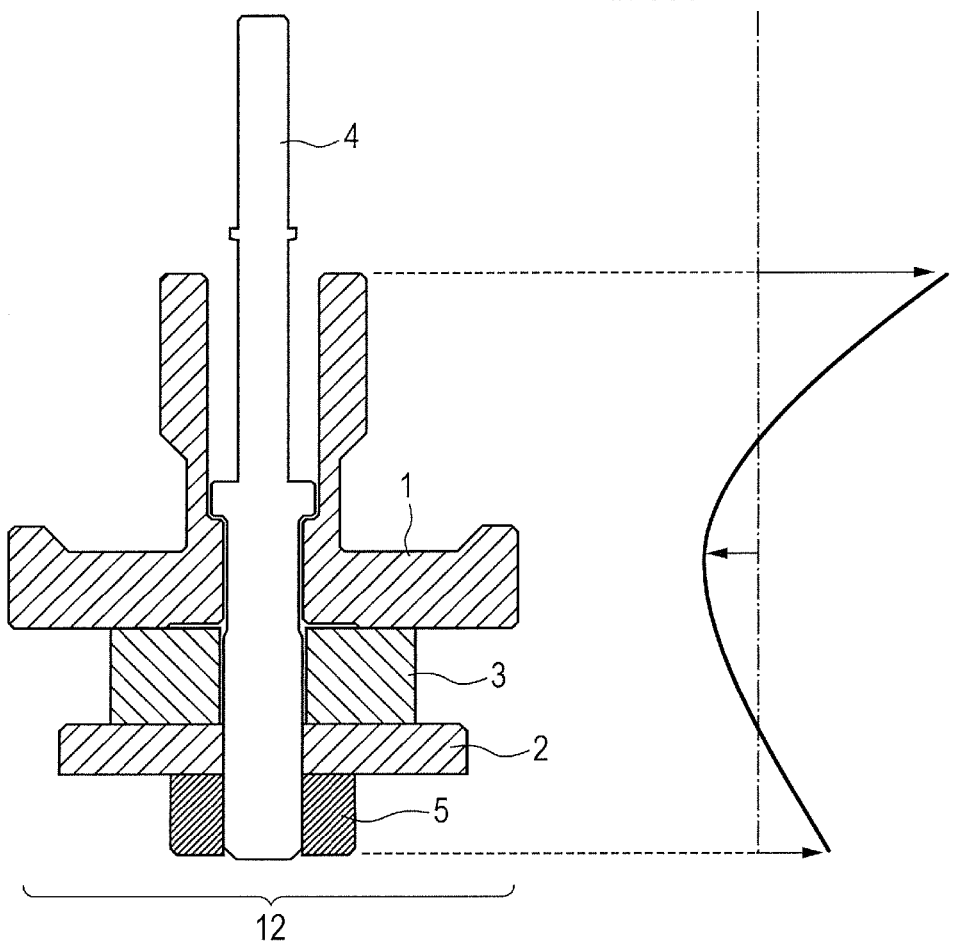
FIG. 2A is a cross-sectional view of a rod-shaped vibrator.
FIG. 2B is a view illustrating the vibration amplitude in vibration mode of the rod-shaped vibrator.

FIG. 2A illustrates a cross-sectional view of the vibrator 12, and FIG. 2B illustrates the vibration amplitude in vibration mode of the vibrator 12.

While FIG. 2B illustrates one of the two flexural vibrations, the other is generated in the direction normal to the page. By adjusting phases of the applied alternating electric fields, the temporal phase difference between the two flexural vibrations can be set to 90 degrees, so that the flexural vibrations of the vibrator 12 rotate around the axis of the shaft 4. This results in an elliptical motion on a surface of the first elastic member which surface contacts the slide member 6, thereby frictionally driving the slide member 6 which is pressed against the first elastic member 1. Consequently, the slide member 6, rotor 7, gear 8 and pressure spring 9 rotate around the axis of the shaft 4 as one unit.

An output of the vibratory drive apparatus is transmitted from the gear 8 to an external gear via the rotor 7. The gear 8 fits into the inner diameter of the rotor 7 to constrain whirling around the rotation axis, and the flange cap 10a in turn fits into the inner diameter of the gear 8. This prevents deviation of the rotor 7 from the rotation center and eliminates moments which cause inclination of the body of the rotor 7 with respect to the sliding surface of the gear 8. Consequently, the rotor 7 and the first elastic member 1 can be kept in stable contact with each other.

Figure 3:
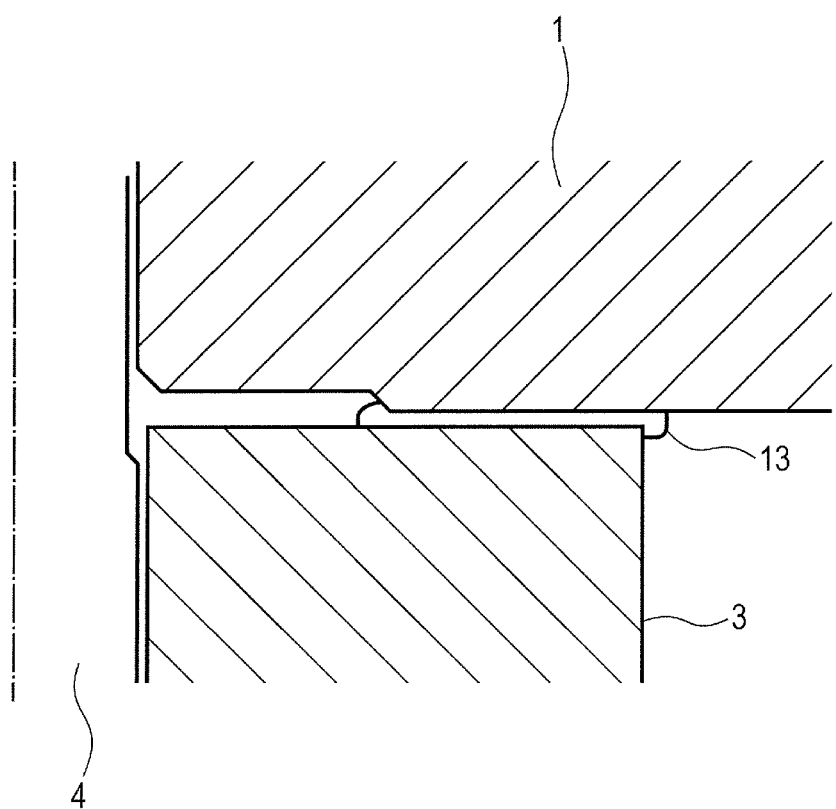
FIG. 3 is an enlarged cross-sectional view illustrating parts of surfaces to which grease is applied.

FIG. 3 is a cross-sectional view illustrating in more detail a portion of the configuration of the vibratory drive apparatus according to the present invention, including the first elastic member 1, piezoelectric element 3 and shaft 4.

A lubricant 13, such as grease and lubricating oil, is applied between the first elastic member 1 and the piezoelectric element 3. For example, the lubricant 13 is applied to the contact surface of one of the first elastic member 1 and the piezoelectric element 3. Grease may be suitably used as the lubricant 13 because of its excellent non-diffusibility to prevent a decrease in the friction coefficient caused by diffusion of the lubricant 13 over the friction surfaces of the first elastic member and the slide member 6. In addition to that, an anti-exudation agent may be applied to the first elastic member 1 in order to further prevent the diffusion of the grease 13 over the friction surface.

Another way of preventing the diffusion over the friction surface is to increase the surface area of a surface of the first elastic member which surface contacts the piezoelectric element 3 by providing on the surface a large number of fine concentric grooves extending in the circumferential direction. Single groove as used in records may be provided instead of the concentric grooves. That is, any kind of groove or grooves may be used as long as they appear to form multiple grooves when viewed in the radial direction.

In order to vibrate the vibrator 12 efficiently, the adhesion between the first elastic member 1, piezoelectric element 3 and second elastic member 2 needs to be improved. Thus, as mentioned above, these three components are clamped with appropriate force by means of the shaft 4 and the lower nut 5. The contact surfaces of the first elastic member 1 and the piezoelectric element 3 are subject to stress due to this clamping force. In particular, the stress concentrates on the inner circumferential edge portion of the first elastic member 1. In this configuration, when the vibrator 12 vibrates according to the vibration mode as illustrated in FIGS. 2A and 2B, shearing force is exerted to the vicinity of the contact surfaces of the first elastic member 1 and the piezoelectric element 3, resulting in slight sliding between the first elastic member 1 and the piezoelectric element 3. At this moment, a portion of the piezoelectric element 3 around the point where stress concentrates as mentioned above is likely to be worn.

However, in the present embodiment, the lubricant 13 sticks physically or chemically to the surfaces of the first elastic member 1 and the piezoelectric element 3 to form a sticky coating, which prevents the wear of the piezoelectric element 3. As compared to an ultraviolet cure anaerobic adhesive which is relatively easy to handle among other adhesives, if the lubricant 13 is used, a process of pressing the first elastic member 1 and the piezoelectric element 3 against each other with an appropriate contact pressure for an appropriate period of time, and a process of curing excessive adhesive which comes out from between the first elastic member 1 and the piezoelectric element 3 by ultraviolet irradiation can be omitted. In addition, when a malfunction is found in any component of the vibrator 12, the vibrator 12 is easily disassembled and reassembled, which can reduce costs.

As described above, according to the present embodiment, by providing the lubricant 13 between the first elastic member 1 and the piezoelectric element 3, a low-cost and highly-durable vibratory drive apparatus can be provided. In the vibratory drive apparatus, the progression of wear of the piezoelectric element 3 can be prevented even when slight sliding occurs between the first elastic member 1 and the piezoelectric element 3 due to the vibration of the vibrator 12. In addition to that, the vibratory drive apparatus does not require complicated assembly processes.

It should be noted that in the case of wear of the piezoelectric element 3 at the contact surface on the side of the second elastic member 2, the wear of the piezoelectric element can also be prevented by providing the lubricant 13.

If a flexible printed circuit board for supplying electric power or a thin plate made of aluminum or copper for mitigating stress is inserted between the first elastic member 1 or second elastic member 2 and the piezoelectric element, the lubricant can also be provided between those components respectively. This can prevent the wear of the flexible printed circuit board, thin plate and piezoelectric element.

According to the present invention, a highly-durable vibratory drive apparatus can be provided without the need for additional assembly processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-140541 filed on Jun. 22, 2012, which is hereby incorporated by reference herein in its entirety.

What is claimed is:

1. A vibratory drive apparatus comprising:
   a vibrator comprising:
      a first elastic member;
      a second elastic member; and
      an electro-mechanical energy conversion element, the electro-mechanical energy conversion element being between the first elastic member and the second elastic member; and
   a moving member having a hollow portion and being configured to contact the first elastic member and be moved relative to the vibrator,
   wherein the first elastic member has a projection portion and a flange portion supporting the moving member, the projection portion being held within the hollow portion of the moving member, and
   wherein a lubricant is provided between the first elastic member and the electro-mechanical energy conversion element.

2. The vibratory drive apparatus according to claim 1, wherein the vibration is excited in the vibrator by application of a driving signal to the electro-mechanical energy conversion element.

3. The vibratory drive apparatus according to claim 1, wherein the moving member is moved relative to the vibrator by vibration excited according to a vibration mode inducing shearing force in a vicinity of a contact surface where the first elastic member and the electro-mechanical energy conversion element contact each other.

4. The vibratory drive apparatus according to claim 1, further comprising an anti-exudation agent between the first elastic member and the electro-mechanical energy conversion element.

5. The vibratory drive apparatus according to claim 1, wherein a fine groove is provided along a circumferential direction on a surface of the first elastic member which surface contacts the electro-mechanical energy conversion element.

6. The vibratory drive apparatus according to claim 1, wherein the lubricant is a non-diffusible lubricant.

7. A vibratory drive apparatus comprising:
   a vibrator comprising:
      a first elastic member;
      a second elastic member; and
      an electro-mechanical energy conversion element, the electro-mechanical energy conversion element being between the first elastic member and the second elastic member; and
   a moving member having a hollow portion and being configured to contact the first elastic member and be moved relative to the vibrator by vibration excited in the vibrator,
   wherein the first elastic member has a projection portion and a flange portion supporting the moving member, the projection portion being held within the hollow portion of the moving member, and
   wherein a lubricant is provided between the second elastic member and the electro-mechanical energy conversion element.

8. The vibratory drive apparatus according to claim 7, wherein the vibration is excited in the vibrator by application of a driving signal to the electro-mechanical energy conversion element.

9. The vibratory drive apparatus according to claim 7, wherein the moving member is moved relative to the vibrator by vibration excited according to a vibration mode inducing shearing force in a vicinity of a contact surface where the second elastic member and the electro-mechanical energy conversion element contact each other.

10. The vibratory drive apparatus according to claim 7, further comprising an anti-exudation agent provided between the second elastic member and the electro-mechanical energy conversion element.

11. The vibratory drive apparatus according to claim 7, wherein a fine groove is provided along a circumferential direction on a surface of the second elastic member which surface contacts the electro-mechanical energy conversion element.

12. The vibratory drive apparatus according to claim 7, wherein the lubricant is a non-diffusible lubricant.

* * * * *